(12) United States Patent
van Lieshout et al.

(10) Patent No.: US 10,030,761 B2
(45) Date of Patent: Jul. 24, 2018

(54) METHOD OF PROVIDING A PREDETERMINED BACKLASH FOR A TRANSMISSION, A METHOD FOR APPLYING A SHEET OF SPACER MATERIAL TO AT LEAST PART OF AN UPRIGHT SIDEWALL OF A FIRST TOOTHED GEAR

(71) Applicant: VCST INDUSTRIAL PRODUCTS, Sint-Truiden (BE)

(72) Inventors: Steven van Lieshout, Geel (BE); Raymond Reyskens, Diepenbeek (BE); Bart Vandewal, Alken (BE)

(73) Assignee: VCST Industrial Products, Sint-Truiden (BE)

( * ) Notice: Subject to any disclaimer, the term of this patent is extended or adjusted under 35 U.S.C. 154(b) by 139 days.

(21) Appl. No.: 14/785,257

(22) PCT Filed: Apr. 17, 2014

(86) PCT No.: PCT/EP2014/057940
§ 371 (c)(1),
(2) Date: Oct. 16, 2015

(87) PCT Pub. No.: WO2014/170452
PCT Pub. Date: Oct. 23, 2014

(65) Prior Publication Data
US 2016/0084370 A1    Mar. 24, 2016

(30) Foreign Application Priority Data

Apr. 17, 2013 (EP) .................................... 13164113

(51) Int. Cl.
*F16H 55/18*     (2006.01)
*F16H 57/12*     (2006.01)
*F16H 57/022*    (2012.01)

(52) U.S. Cl.
CPC ..... *F16H 57/12* (2013.01); *F16H 2057/0224* (2013.01); *F16H 2057/125* (2013.01)

(58) Field of Classification Search
CPC ............ F16H 57/12; F16H 2057/0224; F16H 2057/125
See application file for complete search history.

(56) References Cited

U.S. PATENT DOCUMENTS 2,837,397 A * 6/1958 Frachon .................. G01D 9/28
                                                   346/141
2,886,978 A * 5/1959 Heijnis .................... D01D 1/06
                                                   192/55.1

(Continued)

FOREIGN PATENT DOCUMENTS

EP    1939068 A1     7/2008
GB    2 224 805 A    5/1990
WO    2008/145741 A2  12/2008

OTHER PUBLICATIONS

International Search Report and Written Opinion dated Jun. 24, 2014, issued in corresponding International Application No. PCT/EP2014/057940, filed Apr. 17, 2014, 8 pages.

(Continued)

*Primary Examiner* — Zakaria Elahmadi
(74) *Attorney, Agent, or Firm* — Christensen O'Connor Johnson Kindness PLLC

(57) ABSTRACT

A method of providing a predetermined backlash for a transmission comprising at least a first and a second interlocking toothed gear, the backlash being provided by positioning the first and second gear with respect to each other by means of spacer material applied to at least part of an upright sidewall of at least one first tooth, the upright sidewall facing a second tooth of the second gear adjacent to the first tooth, the layer of spacer material being pressed in between the first and the second tooth, the thickness of the (Continued)

layer of spacer material determining the predetermined backlash between the first and the second tooth.

9 Claims, 2 Drawing Sheets

(56) References Cited

U.S. PATENT DOCUMENTS

| | | | | |
|---|---|---|---|---|
| 5,746,091 | A * | 5/1998 | Schaede | B41F 13/012 |
| | | | | 74/409 |
| 7,406,892 | B2 * | 8/2008 | Takeuchi | F16H 55/16 |
| | | | | 74/409 |
| 8,215,198 | B2 * | 7/2012 | Masuo | B23F 23/10 |
| | | | | 74/406 |
| 2010/0275709 | A1 * | 11/2010 | Vandewal | F16H 57/12 |
| | | | | 74/409 |

OTHER PUBLICATIONS

International Preliminary Report on Patentability and Written Opinion of the International Searching Authority dated Oct. 20, 2015, issued in corresponding International Application No. PCT/EP2014/057940, filed Apr. 17, 2014, 6 pages.

* cited by examiner

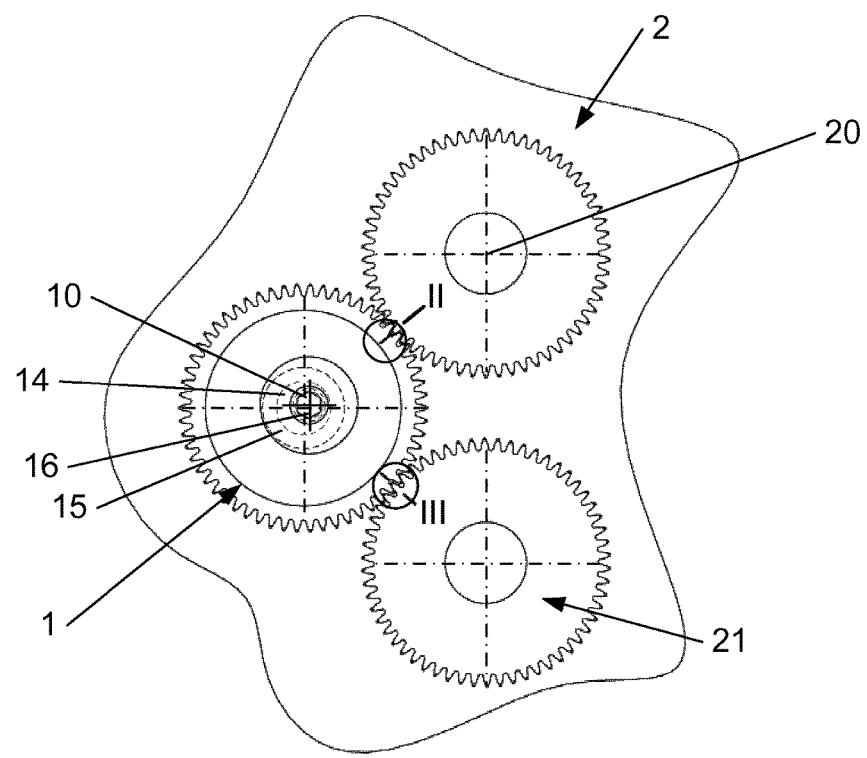
*Fig. 1*
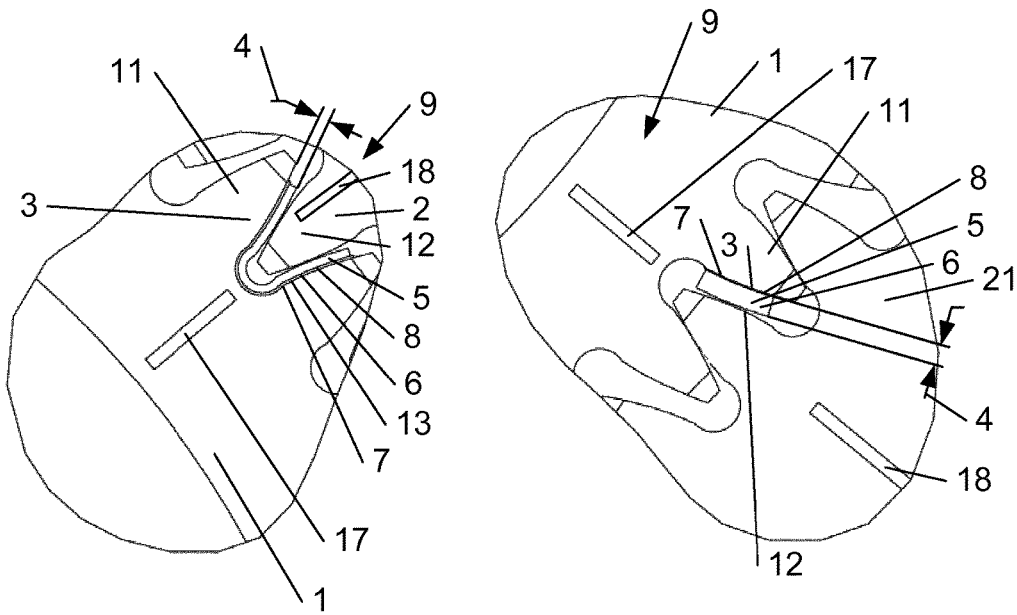
*Fig. 2*  *Fig. 3*

METHOD OF PROVIDING A PREDETERMINED BACKLASH FOR A TRANSMISSION, A METHOD FOR APPLYING A SHEET OF SPACER MATERIAL TO AT LEAST PART OF AN UPRIGHT SIDEWALL OF A FIRST TOOTHED GEAR

FIELD OF THE DISCLOSURE

Embodiments of the present disclosure relate generally to a method of providing a predetermined backlash for a transmission comprising at least a first and a second interlocking toothed gear, according to the preamble of the first claim.

Embodiments of the present disclosure also relate to a first toothed gear and a method for applying a sheet of spacer material to at least part of an upright sidewall of a first toothed gear.

BACKGROUND

The tooth profile interlocking clearance between two mating gears of a gear transmission, the backlash, and in particular the rotational backlash, is known to create a hydrodynamic lubrication, compensating for dimensional changes caused by temperature effects, preventing abrasion or premature wear of the shaft, axles and toothed gears, and compensating bad construction and assembly work. In the serial production of engines, gears or other aggregates, providing a predetermined backlash to two or more toothed gears in mesh (serrated, helical, or other) pressed, screwed or secured otherwise onto driven or secondary shafts, requires elaborate alignment equipment or alignment devices.

WO2002/048575 describes a method of providing a predetermined backlash for a transmission comprising at least a first and a second interlocking toothed gear. The backlash according to this method is provided by positioning the first and the second gear with respect to each other by means of spacer material in the form of a removable coating applied to the upright sidewalls of the teeth of the first gear, the upright sidewalls being provided to face the teeth of the second gear. The first and second gears are positioned with respect to each other by adjusting their mutual position until they are positioned substantially play-free with respect to each other.

Afterwards the coating is mechanically, by rotational action of the gears during the test run of the engine in which they are incorporated, or chemically, by use of a solvent, removed from the first gear.

However, the method disclosed in WO2002/048575 is relatively difficult since application of the coating onto the upright sidewalls of the teeth of the gear is difficult. It is for example difficult, and therefore rather expensive, to adjust the thickness of the coating.

There is thus a need for a method to provide a predetermined backlash to a transmission comprising a first and a second interlocking toothed gear using spacer material which can be more easily applied to a tooth of the gear.

SUMMARY

According to an embodiment, the application of a spacer material comprises the steps of presenting a spacer foil to the upright sidewall of the first tooth, the spacer foil comprising a carrier foil provided with a layer of spacer material along the surface of the carrier foil, the layer of spacer material comprising a first and second layer of adhesive applied along opposing surfaces of the layer of spacer material, the first layer of adhesive being provided along the surface of the carrier foil gluing the layer of spacer material to the surface of the carrier foil, the second layer of adhesive of the spacer material being presented to the upright sidewall of the first tooth, activating the adhesive of the second layer of adhesive such that the layer of spacer material is glued to the upright sidewall of the first tooth, removing the carrier foil from the first tooth, the adhesive power of the first layer of adhesive on the carrier foil being smaller than the adhesive power of the second layer of adhesive on the upright sidewall such that upon removal of the carrier foil from the upright sidewall, the layer of spacer material is transferred from the carrier foil to the upright sidewall.

The inventor has found that the second layer of adhesive can be applied segmented according to the security seal described in DE4321597A1. It has been found that this way the spacer material can wear away in relative small particles while the gears are running, avoiding the risk that rather big particles are created which may end up blocking a filter.

The inventor has found that such method of applying a layer of spacer material is more practical than the known methods as the carrier foil can be used to handle the layer of spacer material. For example, the spacer material can be pressed onto the upright sidewall of the first tooth by pressing the carrier foil with the spacer material facing the upright sidewall of the first tooth directly onto the upright sidewall and, after gluing the spacer material that way onto the upright sidewall of the first tooth, removing the carrier foil from the spacer material. It has been found that in general the spacer material no longer needs to be peeled from the carrier foil prior to be glued onto the upright sidewall of the first tooth. The inventor experienced that peeling of a very thin layer spacer material (e.g. 25 microns-60 microns) prior to be glued onto the upright sidewall is relatively difficult. With the invention, the spacer material will be peeled of the carrier foil after it has been glued to the upright sidewall. This way the thin layer spacer material does not need to be transported unsupported.

Moreover, as the carrier foil is removed, the physical properties of the carrier foil can be fully adapted to the handling and applying of the spacer material, without for example having to take into account the effect of the carrier foil on the gears while in operation.

The inventor has found that by gluing the layer of spacer material to the upright sidewall of the first tooth, the first gear and second gear can be provided with the predetermined backlash without having to perform the additional step of providing the spacer material during provision of the desired backlash. Moreover, the position of the spacer material during provision of the desired backlash is already determined, resulting in a faster provision of the backlash. Moreover, when the sheet of spacer material has been glued to the upright sidewall before providing the first and the second gear with the predetermined backlash, the predetermined backlash can be provided more precisely, since shifting of the spacer material in between the first and second gear is prohibited by the glue.

The inventor has found that such spacer material do not need to be removed from the first gear and can remain onto the first gear.

According to embodiments of the current disclosure, the layer of spacer material is printed on the carrier foil and, more preferably, comprises at least one layer of ink. Such embodiment has been found to have minimal impact on, for example, the oil as while the layer of spacer material wears away during use of the gears, the printed spacer material will not form relative large chunks, which will for example: affect the oil quality; cause leaking at seals or check valves and will for example end up in the oil filter and/or even at least partially block the flow of oil in the engine while in operation, but instead will wear away in the form of relatively small particles which have a smaller effect on the oil quality, and engine oil flow. This way the maximum particles size and/or maximum particle weight can be adapted to the desired cleanliness requirements for engine components as for example demanded by motor manufacturers.

According to embodiments of the current disclosure, the adhesive of the second layer of adhesive is activated using any one of or combinations of: pressure, temperature.

According to embodiments of the current disclosure, the first and/or the second gear comprises indicating means for positioning the first tooth adjacently to the second tooth. The inventor has found that such indicating means greatly facilitate the mounting of the two gears to each other so that the predetermined backlash can be provided since it is for example no longer necessary for an operator to look for the location where the spacer material are provided in order to place the first tooth adjacent to the second tooth.

Embodiments of the present disclosure also relate to a method for applying a layer of spacer material to at least part of an upright sidewall of a first tooth of a first gear.

According to embodiments of this method, a spacer foil, comprising a carrier foil provided with a layer of spacer material along the surface of the carrier foil, the layer of spacer material comprising a first and second layer of adhesive applied along opposing surfaces of the layer of spacer material, the first layer of adhesive being provided along the surface of the carrier foil gluing the layer of spacer material to the surface of the carrier foil, is presented to the upright sidewall of the first tooth of the first gear with the first layer of adhesive facing the upright sidewall and wherein the spacer material is pressed onto the upright sidewall with a pressing tool, after which the adhesive of the second layer of adhesive is activated such that the layer of spacer material is glued to the upright sidewall of the first tooth and the carrier foil is removed from the first tooth. The adhesive power of the first layer of adhesive on the carrier foil is smaller than the adhesive power of the second layer of adhesive on the upright sidewall such that upon removal of the carrier foil from the upright sidewall, the layer of spacer material is transferred from the carrier foil to the upright sidewall.

It has been found that such method can relatively easily be applied to provide a first gear with the layer of spacer material. The obtained gear with the layer of spacer material applied, can then be provided in a transmission with a second gear with a predetermined backlash.

According to more embodiments of the, the pressing tool is a stamp having a shape which is complementary to the shape between teeth of the first gear and the spacer material is stamped onto the upright sidewall.

According to more embodiments of the current disclosure, the spacer material is stamped onto the upright sidewall in an up-and-down movement of the stamp.

According to alternative embodiments of the current disclosure, the pressing tool comprises an application gear and the first gear interlocks with the application gear, the first tooth interlocking with teeth of the application gear so that at least part of the upright sidewall faces the teeth of the application gear, wherein the spacer foil is positioned in between the interlocking teeth of the first gear and the application gear. According to such embodiments the spacer material is applied to the upright sidewall of the first tooth in a rotational movement of the first gear and the application gear.

According to embodiments of the current disclosure, the adhesive of the second layer is activated by pressure and sufficient pressure is applied by the pressing tool to the spacer foil in between the pressing tool and the upright sidewall such that the adhesive of the second layer is activated, gluing the layer of spacer material to the upright sidewall of the first tooth. Although the adhesive of the second layer can also be activated with heat, for example by applying the spacer material with a heated pressure tool, it has been found that pressure is less energy consuming than for example heat. Moreover, it has been found that pressure allows that the predetermined backlash can be provided with an increased accuracy and/or precision as it has been found that often heat activated adhesives, when activated, become more fluid and have a tendency to be pushed from beneath the spacer material thus increasing the risk that an incorrect predetermined backlash is created.

DESCRIPTION OF THE DRAWINGS

The foregoing aspects and many of the attendant advantages of disclosed subject matter will become more readily appreciated as the same become better understood by reference to the following detailed description, when taken in conjunction with the accompanying drawings, wherein:

FIG. 1 shows an overview of a transmission;
FIG. 2 shows a detail of FIG. 1;
FIG. 3 shows another detail of FIG. 1.

DETAILED DESCRIPTION

Figure 4:
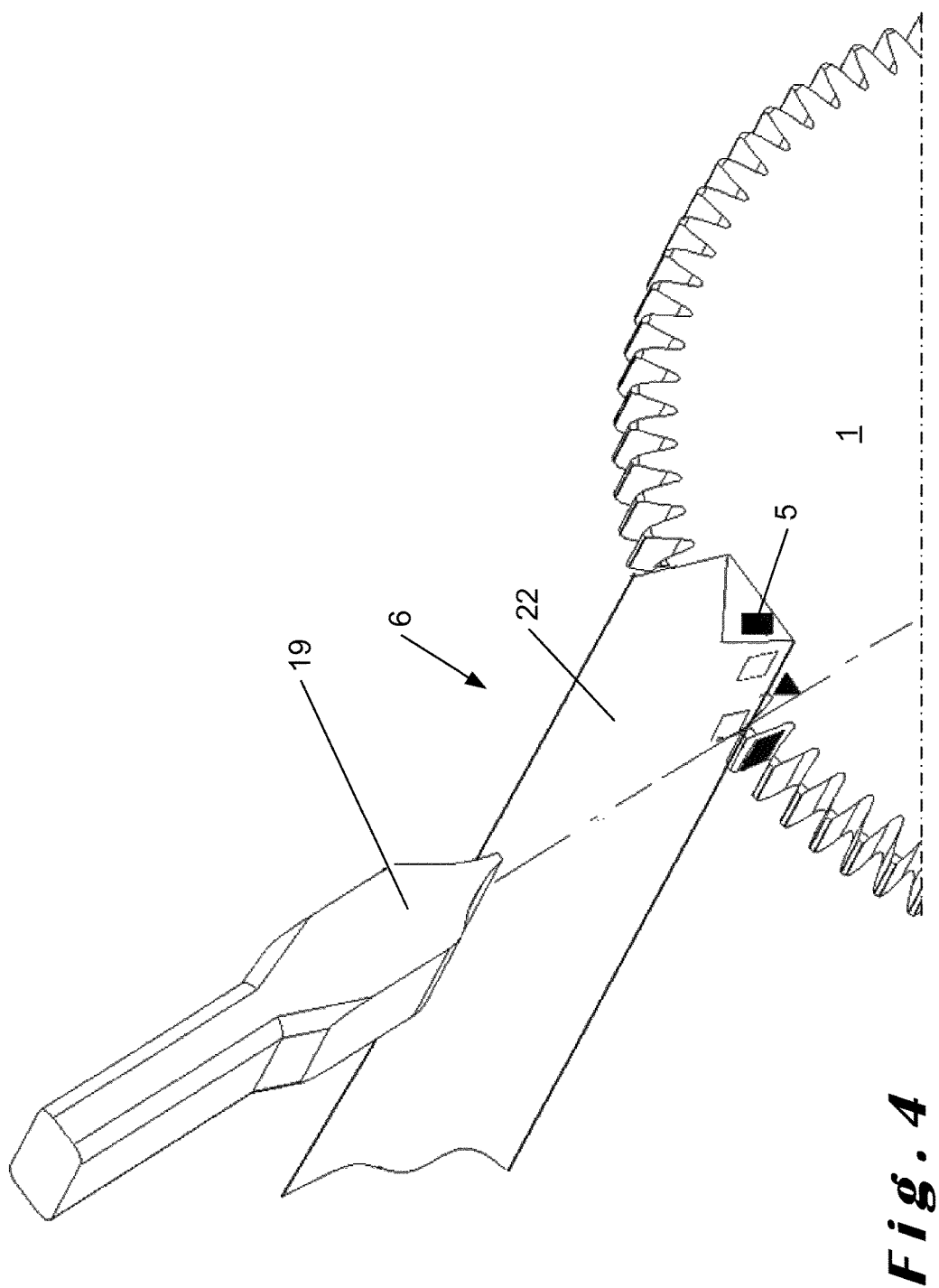
FIG. 4 shows an embodiment for applying spacer material to the first toothed gear according to embodiments of the present disclosure.

FIG. 1 shows a transmission comprising a first toothed gear 1 and a second toothed gear 2. The first gear 1 and the second gear 2 are positioned such that they can interlock with each other. The first gear 1 is for example fixed onto a first shaft 10 or rotatably mounted on for example a first bearing 14 while the second gear 2 is for example fixed onto a second shaft 20 or rotatably mounted on for example a second bearing.

The position of the first gear 1 with respect to the second gear 2 can be adjusted using a known eccentric fixed bearing 14 or any other means for adjusting the position of the first gear 1 with respect to the second gear 2. Alternatively the position of the first gear 1 with respect to the second gear 2 can also be adjusted by other known means for adjusting the position of the second gear 2 with respect to the first gear 1.

In the example shown, the position of the first gear 1 with respect to the second gear 2 can be adjusted in directions in a plane substantially perpendicular to the first shaft 10, for example substantially horizontal and vertical directions as for example shown in FIG. 1, using an eccentric adjustment mechanism, i.e. the eccentric fixed bearing 14. Gear 1 can rotate on bearing 14 which can be moved in horizontal and vertical direction relative to a bolt 16. After assembly and adjustment, the position can be fixed by tightening the bolt 16 so the bearing 14 is axially clamped between the bolt 16 and axial fixture means for example an axial fixture face of for example a mounting arrangement which is not shown in FIG. 1.

As is known from the state of the art, the backlash 4 between two adjacent gears of respectively the first 1 and second 2 gear can be adjusted by adjusting the position of the first gear 1 with respect to the second gear 2 with the help of spacer material 5.

The spacer material 5 is applied to at least part of an upright sidewall 3 of at least one first tooth 11 of the first gear 1. Examples of spacer material 5 which has been applied to the first tooth 11 are shown in FIGS. 2 and 3. In some embodiments, the spacer material 5 is applied as a layer, as shown in the FIGURES.

After being applied to the upright sidewall 3, the mutual position of the first and the second gear 1, 2 is adjusted so that the first tooth 11, provided with the spacer material 5, interlocks substantially play-free with second teeth of the second gear 2, as shown in FIGS. 2 and 3. In the example shown in FIG. 1 this is done by adjusting the position of the first gear 1 by the eccentric fixed bearing 14.

The thickness of the spacer material 5 then substantially determines the backlash 4 between the first 1 and the second 2 gear wheel, as can be seen on FIGS. 2 and 3.

The thickness of the spacer material 5 for example is 25 micron-120 micron. The thickness of the spacer material 5 in some embodiments is 25 micron-60 micron.

The spacer material 5 in some embodiments is rigid enough so that the thickness of the spacer material 5, and therefore the backlash 4, remains substantially uninfluenced by the pressure applied to the spacer material 5 by the tooth 12 of the second gear 2. The inventor has found that spacer material 5 which is sufficiently rigid allows the first and second gear 1, 2 to be positioned with respect to each other more easily and more precisely.

The inventor has moreover found that when the spacer material 5 is compressible enough so that its presence does not affect rotation of the gears 1, 2, the spacer material 5 can remain onto the first gear 1 during operation of the gears 1, 2 and need not be removed after provision of the predetermined backlash 4.

The choice of the rigidity and the compressibility is however not critical for embodiments of the invention and spacer material 5 having a wide range of rigidities and compressibilities can be employed. Spacer material 5 with a relative high rigidity which could affect rotation of the gears 1, 2 can for example be removed after providing the predetermined backlash 4. Spacer material 5 with a relative high compressibility could be used to provide the predetermined backlash 4 by applying a predetermined force to the first and/or second gear when adjusting their mutual position to obtain the predetermined backlash 4.

In some embodiments, spacer material 5 is used which has a rigidity which allows the spacer material 5 to remain onto the first gear 1 during operation and a compressibility allowing the first gear 1 to be positioned with respect to the second gear 2 with an increased ease and precision.

The spacer material 5 comprises a first and a second layer of adhesive applied along opposing surfaces of the spacer material 5 which is itself layer shaped. The second layer of adhesive of the spacer material 5 glues the spacer material 5 to the upright sidewall 3 of the first tooth 11. The first layer of adhesive of the spacer material 5 is provided for gluing the spacer material 5 to a carrier foil 22. The spacer material 5 and the carrier foil 22 together form part of a spacer foil 6 which is used for applying the spacer material 5 to the upright sidewall 3 of the first tooth 11.

The spacer material 5 in some embodiments further comprises several layers of material. In some embodiments, at least one of the layers is a layer of ink. However, the spacer material 5 can comprise several layers of ink. For example the spacer material 5 can comprise one, two, three, four five, six, seven, etc. layers of ink on top of each other.

The thickness of the spacer material 5, for example determined by the thickness of the first and the second layer of adhesive material and, if present, the thickness of the at least one layer of ink, can be determined by the person skilled in the art in function of the desired application of the spacer material 5, for example depending on the desired thickness of the spacer material 5.

The ink for example is acrylic based and for example colored by, for example, color pigments, for example white ink. It has been found that white ink provides a stable layer thickness while it also provides a good contrast on the gear to visually detect the ink, with for example an eye or by camera.

In some embodiments, at least part of the spacer material 5, such as for example at least the ink of the spacer material 5, if present, is applied by printing, such as screen-printing. In some embodiments, the spacer material 5 is applied segmented, for example as described in DE4321597A1, to further reduce the size of any particles coming off the gear.

The first layer of adhesive for example comprises an acrylic lacquer as it has been found that the spacer material in such case will remove from the carrier foil relatively easy. The acrylic lacquer will in addition protect the ink layer.

In some embodiments, the second layer of adhesive is a permanent acrylic based glue that is activated by, for example, pressure. In some embodiments the adhesive used will give a relatively strong bounding to the metal surface (for example more than or equal to 15N/25 mm). It has been found that such a layer of glue avoids the spacer material to be taken off as a whole further reducing the dimensions of the spacer material 5 coming off the gear. The adhesive is activated when pressure is applied to the spacer material, for example when positioning the mutual position of the first and the second gear 1, 2. Such adhesive is for example an acrylic based glue. Any other adhesive known to the person skilled in the art is however also possible such as for example heat or UV activated adhesives or adhesives which are activated via a chemical reaction of a second element like two-component based glues.

The carrier foil 22 can be any type of carrier foil 22 deemed appropriate by the person skilled in the art, but in some embodiments is a transparent polyester foil, preferably provided with a release coating, such as a silicone release coating, allowing the spacer material to more easily leave the carrier foil. In some embodiments, the carrier foil has a color contrasting with the spacer material allowing the spacer material to be detected by, for example, sensors for positioning the spacer material relative to the upright sidewall of the gear.

According to some embodiments, the spacer material, more in particular the side of the spacer material 5 which opposes the side of the spacer material which contacts the carrier foil 22, is covered with a cover material such as for example a silicon paper avoiding that the spacer material 5 sticks to the backside of the carrier foil 22 when it is rolled to a roll. The cover material such as the silicon paper can be in the form of a longitudinal strip covering several pieces of spacer material or can alternatively be in the form of several distinct pieces of cover material such as silicon paper covering for example individual pieces of spacer material. The longitudinal strip covering several pieces of spacer material is preferred as it allows the cover material to be more easily recovered, avoiding for example little pieces of cover material falling for example into or onto the work piece to which the gear is being mounted. Moreover, it has been found that the longitudinal strip covering several pieces of spacer material is more easy to be peeled off the spacer material.

The thickness of the spacer material 5 in some embodiments is substantially the same along the surface of the spacer material 5. This is however not critical for the invention and the thickness of the sheet 6 may vary.

Although it is sufficient to provide only part of the upright sidewall 3 of the first tooth 11 with spacer material 5, substantially the entire upright sidewall 3 in upward direction or axial direction of the gear or both can be provided with spacer material 5. FIG. 3 for example shows that a sheet 6 of spacer material is glued to substantially one entire upright sidewall 3 of one first tooth 11. In this case the thickness of the spacer material 5 substantially equals the backlash 4, as indicated on FIG. 3.

Alternatively, more than one upright sidewall 3 can be provided with spacer material 5. FIG. 2 for example shows that spacer material 5 is applied to opposing upright sidewalls 3, 13 of subsequent first teeth of the first gear 1. In case the thickness of the spacer material 5 on the opposing upright sidewalls of the subsequent first teeth is substantially identical, the thickness of both layers of spacer material 5 substantially equals half of the backlash 4, as indicated on FIG. 2.

Using a thicknesses for the spacer material 5 of between 25 micron-60 micron, for example, by applying the spacer material 5 to opposing upright sidewalls of adjacent first teeth of the first gear, the thickness of the spacer material 5 can be used to obtain a backlash which is between 50 micron-120 micron. By, for example, applying only a single opposing upright sidewall of adjacent first teeth of the first gear a backlash can be obtained, with this range of thicknesses, which is between 25 micron-60 micron.

Although separate layers of spacer material 5 can be applied to different upright sidewalls of the first teeth 11 of the first gear 1, a single layer of spacer material 5 can also extend over different subsequent first teeth 11 of the first gear 1, as shown in FIG. 2. In such case the spacer material 5 extends along circumferential direction of the first gear 1 pressed on and between several first teeth 11, 13 of the first gear 1. Although FIG. 2 only shows that the spacer material 5 extends over two upright sidewalls 3 of subsequent first teeth 11, the spacer material 5 can also extend over more than two upright sidewalls 3 of subsequent first teeth for example, 3, 4, 5, 6, 7 or more upright sidewalls 3. The spacer material 5 can for example also extend over at least the entire circumference of the first gear 1.

Although FIGS. 2 and 3 show that only the first gear 1 is provided with spacer material 5, the spacer material 5 can also be partly provided to the second gear 2.

As shown in FIG. 1, the spacer material 5 can also be applied to non-subsequent first teeth 11 of the first gear 1. The inventor has found that by adding spacer material 5 to non-subsequent first teeth 11 of the first gear 1, the first gear 1 can be positioned with respect to additional second gears 21 with a predetermined backlash 4 without having to apply spacer material 5 to the entire circumference of the first gear 1. The thickness of the different spacer material 5 applied to the non-subsequent first teeth 11 of the first gear 1 can also be the same or can be different depending from the backlash 4 desired at the respective second gear 2.

Although FIG. 1 shows only two second gears 2, 21, also more than two second gears 2, 21 can be provided to engage the first gear 1. This however can be determined by the person skilled in the art.

More than one gear can be provided with means to adjust the relative position of the gear and its mating gears and/or also more than one gear can be provided with spacer material, especially when the relative position of more than two mating gears need to be adjusted with respect to each other in order to adjust the desired backlash between the different mating gears. This however depends on the number of gears used and their general relative position with respect to each other and can be determined by the person skilled in the art.

To position the first tooth 11 comprising the spacer material 5 adjacently to the second tooth 12 to provide the correct predetermined backlash 4 between the first gear 1 and the second gear 2, the first 1 and/or second 2 gear in some embodiments comprises indicating means 9. The indicating means 9 can for example comprise a first mark 17 on the first gear 1 and a second mark 18 on the second gear 2 such that when the two marks 17, 18 are aligned the first tooth 11 and the second tooth 12 are positioned adjacently such that the upright sidewall 3 faces the second tooth 2, as shown in FIGS. 2 and 3. The marks 17, 18, although not critical for the invention, may be positioned in the vicinity of the first 11 and second 12 tooth respectively, as shown in FIGS. 2 and 3.

The marks 17, 18 can take any shape and dimensions such as for example an arrow, a line, etc.

The application of the spacer material 5 comprises the steps of presenting the spacer foil 6, more in particular the second layer of adhesive, to the upright sidewall 3 of the first tooth 11, activating the adhesive of the second layer of adhesive such that the layer of spacer material 5 is glued to the upright sidewall 3 of the first tooth 11 and removing the carrier foil 22 from the first tooth 11. The adhesive power of the first layer of adhesive on the carrier foil 22 is smaller than the adhesive power of the second layer of adhesive on the upright sidewall 3 such that upon removal of the carrier foil 22 from the upright sidewall 3, the layer of spacer material 5 is transferred from the carrier foil 22 to the upright sidewall 3.

The method for applying the layer of spacer material 5 to at least part of the upright sidewall 3 of a first tooth 11 of the first gear 1 is for example shown in FIG. 4.

According to the method shown in FIG. 4, the spacer material 5 is pressed onto the upright sidewall 3 with a pressing tool 19. The pressing tool 19 shown in FIG. 4 is in the form of a stamp which is provided to stamp the spacer material 5 onto the upright sidewall 3. The pressing tool 19 thereto in some embodiments has a shape which is complementary to the shape between teeth of the first gear 1. Hereafter, the adhesive of the second layer of adhesive is activated such that the layer of spacer material 5 is glued to the upright sidewall 3 of the first tooth 11 and the carrier foil 22 is removed from the first tooth 11, the adhesive power of the first layer of adhesive on the carrier foil 22 being smaller than the adhesive power of the second layer of adhesive on the upright sidewall 3 such that upon removal of the carrier foil 22 from the upright sidewall 3, the layer of spacer material 5 is transferred from the carrier foil 22 to the upright sidewall 3.

As shown in FIG. 4, the pressing tool 19 is a stamp 19 having a shape which is complementary to the shape between teeth of the first gear 1 and stamping the spacer material 5 onto the upright sidewall 3. In some embodiments, the shape of the stamp 19 is the contra shape of the shape in between the teeth of the first gear 1.

As shown in FIG. 4, the spacer material 5 is stamped onto the upright sidewall 3 in an up-and-down movement of the stamp 19.

As can be further seen in FIG. 4, the carrier foil 22 extends along a longitudinal direction with several separate pieces of spacer material 5 positioned next to each other along the longitudinal direction. This way several teeth, of the same or different gears, can be provided with spacer material 5. The longitudinal direction can extend substantially parallel along the axis of rotation of the first gear 1 or, as shown in FIG. 4, substantially perpendicular to it. The carrier foil 22 can be provided to be forwarded, for example by forwarding means, along the longitudinal direction to, for example, put a new spacer material 5 in front of the pressing tool 19 for subsequently applying a spacer material 5 to a new gear or a different tooth of the first gear 1.

According to alternative embodiments of the current disclosure, the pressing tool comprises an application gear and wherein the first gear 1 interlocks with the application gear, the first tooth 11 interlocking with teeth of the application gear so that at least part of the upright sidewall 3 faces the teeth of the application gear, wherein the spacer foil 6 is positioned in between the interlocking teeth of the first gear 1 and the application gear. Such embodiment however has not been shown in the FIGURES.

In some embodiments, the adhesive of the second layer is activated by pressure and sufficient pressure is applied by the pressing tool 19 to the spacer foil 6 in between the pressing tool 19 and the upright sidewall 3 such that the adhesive of the second layer is activated, gluing the layer of spacer material to the upright sidewall 3 of the first tooth 11.

The invention claimed is:

1. A method for applying a layer of spacer material to at least part of an upright sidewall of a first tooth of a first gear for providing a predetermined backlash for a transmission comprising at least first and second interlocking toothed gears, the backlash being provided by positioning the first and second gear with respect to each other by a layer of spacer material applied to at least part of an upright sidewall of at least one first tooth, the upright sidewall facing a second tooth of the second gear adjacent to the first tooth, the layer of spacer material being pressed in between the first and the second tooth, the thickness of the layer of spacer material determining the predetermined backlash between the first and the second tooth, the method of applying the spacer material comprising:

presenting a spacer foil to the upright sidewall of the first tooth, wherein the spacer foil comprises a carrier foil provided with a layer of spacer material along the surface of the carrier foil, the layer of spacer material comprising a first and second layer of adhesive applied along opposing surfaces of the layer of spacer material, respectively, the first layer of adhesive being provided along the surface of the carrier foil gluing the layer of spacer material to the surface of the carrier foil;

presenting the spacer foil to the upright sidewall of the first tooth of the first gear with the second layer of adhesive facing the upright sidewall and pressing the spacer material onto the upright sidewall with a pressing tool, wherein the pressing tool is a stamp having a shape which is complementary to the shape between teeth of the first gear for stamping the spacer material onto the upright sidewall, and wherein the spacer material is stamped onto the upright sidewall in an up-and-down movement of the stamp;

activating the second layer of adhesive such that the layer of spacer material is glued to the upright sidewall of the first tooth and removing the carrier foil from the first tooth, wherein the adhesive power of the first layer of adhesive on the carrier foil being smaller than the adhesive power of the second layer of adhesive on the upright sidewall such that upon removal of the carrier foil from the upright sidewall, the layer of spacer material is transferred from the carrier foil to the upright sidewall.

2. The method according to claim 1, wherein the layer of spacer material is printed on the carrier foil.

3. The method according to claim 1, wherein the layer of spacer material comprises at least one layer of ink.

4. The method according to claim 1, wherein the layer of spacer material is screen printed on the carrier foil.

5. The method according to claim 1, wherein the adhesive of the second layer of adhesive is activated using any one of or combinations of: pressure, light, and temperature.

6. The method according to claim 1, where the second layer of adhesive is segmented.

7. A method according to claim 1, wherein the first and/or the second gear comprises indicating means for positioning the first tooth adjacently to the second tooth.

8. A method according to claim 1, wherein the pressing tool comprises an application gear and wherein the first gear interlocks with the application gear, the first tooth interlocking with teeth of the application gear so that at least part of the upright sidewall faces the teeth of the application gear, wherein the spacer foil is positioned in between the interlocking teeth of the first gear and the application gear.

9. A method according to claim 1, wherein the adhesive of the second layer is activated by pressure and that sufficient pressure is applied by the pressing tool to the spacer foil in between the pressing tool and the upright sidewall such that the adhesive of the second layer is activated, gluing the layer of spacer material to the upright sidewall of the first tooth.

* * * * *